United States Patent [19]
Mortillo et al.

[11] Patent Number: 5,159,896
[45] Date of Patent: Nov. 3, 1992

[54] POULTRY NEST PAD

[75] Inventors: Anthony J. Mortillo, Chesterfield; Danny B. Cochran, Ballwin; Anthony J. Micale, Jr., Chesterfield, all of Mo.

[73] Assignee: Monsanto Company, St. Louis, Mo.

[21] Appl. No.: 853,285

[22] Filed: Mar. 18, 1992

[51] Int. Cl.⁵ ............................................ A01K 31/14
[52] U.S. Cl. .................................................. 119/50.5
[58] Field of Search ................................. 119/50.5, 29

[56] References Cited

U.S. PATENT DOCUMENTS 3,729,364 4/1973 Doleman et al. ..................... 161/36
3,980,050 9/1976 Neubauer ............................ 119/172

Primary Examiner—Gene Mancene
Assistant Examiner—Thomas Price
Attorney, Agent, or Firm—Lawrence L. Limpus

[57] ABSTRACT

A gray poultry nest pad is taught. The gray color is defined by the "Munsell System" comprising a hue of 2.5R through 10RP inclusive, a value of 3 through 9 inclusive and a chroma of 0 through 2 inclusive.

5 Claims, 1 Drawing Sheet

POULTRY NEST PAD

BACKGROUND OF THE INVENTION

This invention relates to poultry nest pads for use by poultry breeders and egg producers.

More particularly, this invention relates to an improved poultry nest pad for egg laying hens.

More particularly, this invention relates to an improved poultry nest pad that encourages an increased egg production from egg laying hens.

DESCRIPTION OF THE PRIOR ART

The individual farmer with a few chickens usually provided a house for the chickens with nests created from straw, or other available materials, to encourage egg laying at a location where the eggs could be easily gathered. As the poultry and egg industries grew, large houses became commonplace and new materials were desired for use as the nests to provide longer useful life for the nest and to provide a cleaner environment for the poultry and eggs. As a result rubber mats, mats made of non-woven materials and plastic nest pads such as, for example, the AstroTurf ® poultry nest pad produced by Monsanto Company were developed. The AstroTurf poultry nest pad is produced as a thermoplastic, three-dimensional, molded grass-like product such as that shown in U.S. Pat. No. 3,507,010. These poultry nest pads were produced in the natural farm colors such as brown and green so that the pads would be accepted by the poultry.

SUMMARY OF THE INVENTION

This invention is directed to an improved poultry nest pad that encourages an increased egg production from egg laying hens. More specifically the invention is a gray poultry nest pad. The gray color utilized in this invention is specified as the color space defined by "The Munsell System" in terms of hue, value and chroma as set out in the Munsell ® *Book Of Color—Glossy Finish Collection*, 1976 Edition by Macbeth ® Division of Kollmorgen, in which:

Hue is 2.5 R through 10 RP inclusive;
Value is 3 through 9 inclusive; and
Chroma is 0 through 2 inclusive.

The gray color utilized in this invention is more preferably specified as the color space defined by "The Munsell System" in terms of hue, value and chroma as set out in the *Munsell ® Book Of Color—Glossy Finish Collection*, 1976 Edition by Macbeth ® Division of Kollmorgen, in which:

Hue is 2.5 R through 10 RP inclusive;
Value is 4 through 8.5 inclusive; and
Chroma is 0 through 1 inclusive.

An expanded view, or more detail, of a portion of the color space defined above is presented in the *Munsell ® Book Of Color—Nearly Neutrals TM Collection*, 1991 Edition by Macbeth ® Division of Kollmorgen.

In addition to the definition above, the gray color may be specified as the color space defined as N3 through N9 inclusive, and preferably as N4 through N8.5 inclusive, as set out in *The Munsell ® Neutral Value Scale*, 1971 Edition by Macbeth ® Division of Kollmorgen.

These and other features and advantages of the present invention will become apparent from the following detailed description, wherein reference is made to the figures in the accompanying drawings.

DESCRIPTION OF THE PREFERRED EMBODIMENTS

This invention is directed to an improved poultry nest pad that encourages an increased egg production from egg laying hens. More specifically the invention is a gray poultry nest pad.

Figure 1:
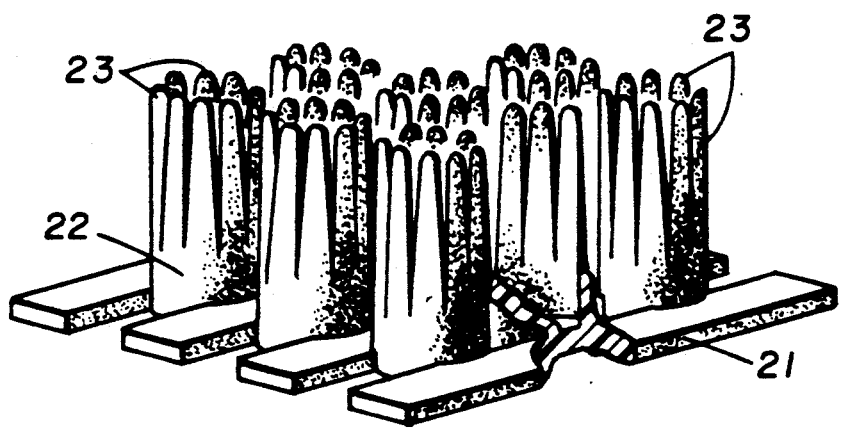
FIG. 1 is a pictorial view of a portion of a poultry nest pad illustrating the projecting members and the perforations in the base of the liner.
Figure 2:
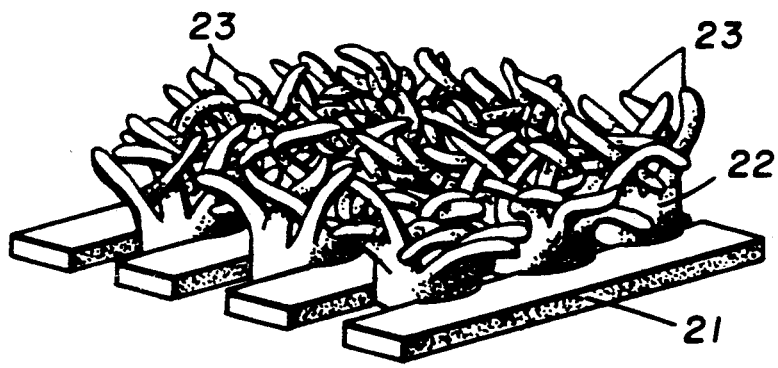
FIG. 2 is a pictorial view of the portion of a poultry nest pad of FIG. 1 after it has undergone a texturizing treatment to impart a grass-like resemblance to the liner.

The AstroTurf ® poultry nest pad produced by Monsanto Company, shown in two embodiments in FIGS. 1 and 2, is the preferred shape for the poultry nest pad of this invention. This poultry nest pad is produced as a thermoplastic, three-dimensional, molded grass-like product such as that shown in U.S. Pat. No. 3,507,010, the specification of which is incorporated by reference. The poultry nest pad has a relatively flat matrix formed of parallel strips or ribs 21 separated by hollow, circular clusters or buds 22 from which projections 23 extend to simulate natural grass. The clusters 22 do not abut one another. They are separated from one another to provide openings or holes in the matrix between adjacent clusters 22 and through the center of the hollow clusters 22 to allow drainage through the poultry nest pad to enable easier cleaning of the nest pad and to enable waste or refuse from the hens to flow through the nest pad between cleanings. The projections 23 extending from the clusters 22 are essentially vertical after being molded, as shown in FIG. 1. To impart the appearance of natural grass it is necessary to texture the molded material to disperse the tips of the projections 23 randomly, much in the manner of natural grass. This may be conveniently done by applying a plate with pressure to the top of the molded material, that is, to the side from which the projections extend. This texturing imparts a permanent crimp in the projections 23 whereby they remain bent or flattened with the tips dispersed randomly over the surface, as shown in FIG. 2.

While the poultry nest pad construction describe above is preferred, it is not the only construction that may be used. Rubber mats, mats made of non-woven materials and plastic materials having other configurations may also be used without detracting from this invention.

The important feature of this invention is the provision that the poultry nest pads must be gray in color. Galvanized sheet metal color is the primary color seen by poults prior to their placement in the breeder house. Poultry research indicates that poults are imprinted by what they see at this young age. Thus, gray poultry nest pads resemble the galvanized sheet metal color and provide a more comfortable environment. The hens put on gray nesting appear to be more content than hens placed in houses with nest pads of other conventional colors and this encourages the hens to produce more eggs. Up to thirty-five percent more eggs were laid in the gray poultry nest pads than in nest pads of other colors.

The gray color utilized in this invention is specified as the color space defined by "The Munsell System" in terms of hue, value and chroma as set out in the *Munsell® Book Of Color—Glossy Finish Collection*, 1976 Edition by Macbeth® Division of Kollmorgen, in which:

Hue is 2.5 R through 10 RP inclusive;
Value is 3 through 9 inclusive; and
Chroma is 0 through 2 inclusive.

The gray color utilized in this invention is more preferably specified as the color space defined by "The Munsell System" in terms of hue, value and chroma as set out in the *Munsell® Book Of Color—Glossy Finish Collection*, 1976 Edition by Macbeth® Division of Kollmorgen, in which:

Hue is 2.5 R through 10 RP inclusive;
Value is 4 through 8.5 inclusive; and
Chroma is 0 through 1 inclusive.

An expanded view, or more detail, of a portion of the color space defined above is presented in the *Munsell® Book Of Color—Nearly Neutrals ™ Collection*, 1991 Edition by Macbeth® Division of Kollmorgen.

In addition to the definition above, the gray color may be specified as the color space defined as N3 through N9 inclusive, and preferably as N4 through N8.5 inclusive, as set out in The *Munsell® Neutral Value Scale*, 1971 Edition by Macbeth® Division of Kollmorgen.

The most common color currently used for nest pads is brown. A study was made to compare the results of using different colors for the poultry nest pads. In the study brown nest pads were compared in separate tests to red, green, black and gray nest pads. For the study, newly hatched chicks were raised and the nest pads were introduced during the chicks' twentieth week. Four groups of chicks were used in each test. In Test 1 brown and black nest pads were compared, in Test 2 brown and green nest pads were compared, in Test 3 brown and gray nest pads were compared, and in Test 4 brown and red nest pads were compared. In each test, an equal number of nest pads of each nest pad color were used. During the twenty-eighth and the thirty-second weeks, the number of eggs in each nest during a period of five days were counted. The number of eggs in the nests of each nest pad color were averaged to determine the number of eggs per nest per five day period (Eggs/Nest/5 Day Period) and the results are shown in Table 1.

TABLE 1

| Nest Color | Eggs/Nest/5 Day Period |
|---|---|
| Brown | 16.5 |
| Black | 14.7 |
| Brown | 17.5 |
| Green | 16.1 |
| Brown | 14.7 |
| Gray | 19.9 |
| Brown | 16.2 |
| Red | 17.0 |

In the tests comparing brown and black, brown and green, and brown and red nest pads, the hens did not exhibit any significant preference for one color of nest pad over the other color of nest pad. There was even a slight preference for the brown pad over the black and green pads. However, in the test comparing the brown nest pad to the gray nest pad, the difference in egg production was significant as there were more than thirty-five percent (35%) more eggs laid in the nests having the gray nest pad than in the nests having the brown nest pad.

It will be apparent from the foregoing that many other variations and modifications may be made in the apparatus herein before described, by those having experience in this technology, without departing from the concept of the present invention. Accordingly, it should be clearly understood that the apparatus depicted in the accompanying drawings and referred to in the foregoing description are illustrative only and not intended to have limitations on the scope of the invention.

We claim:

1. A gray poultry nest pad wherein said gray is defined as N3 through N9 on the Munsell Neutral Value Scale.

2. The poultry nest pad of claim 1 wherein said gray is defined as N4 through N8.5 inclusive on the Munsell Neutral Value Scale.

3. A poultry nest pad having a color defined by the "Munsell System" comprising a hue of 2.5 R through 10 RP inclusive, a value of 3 through 9 inclusive and a chroma of 0 through 2 inclusive.

4. The poultry nest pad of claim 3 having a color defined by the "Munsell System" comprising a hue of 2.5 R through 10 RP inclusive, a value of 4 through 8.5 inclusive and a chroma of 0 through 1 inclusive.

5. A poultry nest pad comprising a flat matrix formed of ribs separated by clusters which provide openings in said matrix and projections extending form said matrix, said poultry nest pad having a color defined by the "Munsell System" comprising a hue of 2.5 R through 10 RP inclusive, a value of 3 through 9 inclusive and a chroma of 0 through 2 inclusive.

* * * * *

REEXAMINATION CERTIFICATE (2486th)
United States Patent [19]
Mortillo et al.

[11] B1 5,159,896
[45] Certificate Issued Feb. 14, 1995

[54] POULTRY NEST PAD

[75] Inventors: Anthony J. Mortillo, Chesterfield; Danny B. Cochran, Ballwin; Anthony J. Micale, Jr., Chesterfield, all of Mo.

[73] Assignee: Monsanto Company, St. Louis, Mo.

Reexamination Request:
No. 90/003,357, Mar. 11, 1994

Reexamination Certificate for:
Patent No.: 5,159,896
Issued: Nov. 3, 1992
Appl. No.: 853,285
Filed: Mar. 18, 1992

[51] Int. Cl.$^6$ .............................................. A01K 31/14
[52] U.S. Cl. .................................................... 119/50.5
[58] Field of Search ................................. 119/50.5, 29

[56] References Cited

U.S. PATENT DOCUMENTS 2,592,430  4/1952  King ........................................ 119/48
3,011,477  12/1961  Bresser et al. ................... 119/50.5 X

FOREIGN PATENT DOCUMENTS 739790    11/1932  France.
8900955   11/1990  Netherlands.
1043458   10/1964  United Kingdom.

OTHER PUBLICATIONS

Hurnik, J. F., et al. "Colour As A Stimulus For The Choice Of The Nesting Site By Laying Hens", 1973 Br. Poult. Sci. 14: 1–8.

Brake, J., "Comparison Of Two Nesting Materials For Broiler Breeders" 1985 Poultry Science 64: 2263–2266.

Brake, J., "Some Features To Consider When Buying Mechanical Nests", Feb. 1990 Poultry Digest, 18, 20, 22.

Wood–Gush, D. G. M., et al., "Some Factors Affecting The Choice Of Nests By The Hen", 1970 Br. Poult. Sci. 11: 415–417.

Siegel, P. B., et al., "A Comparison Of Various Poultry Nesting Materials", 1959 Poultry Sci. 38; 1247 (Abstr).

*Primary Examiner*—Gene Mancene

[57] ABSTRACT

A gray poultry nest pad is taught. The gray color is defined by the "Munsell System" comprising a hue of 2.5R through 10RP inclusive, a value of 3 through 9 inclusive and a chroma of 0 through 2 inclusive.

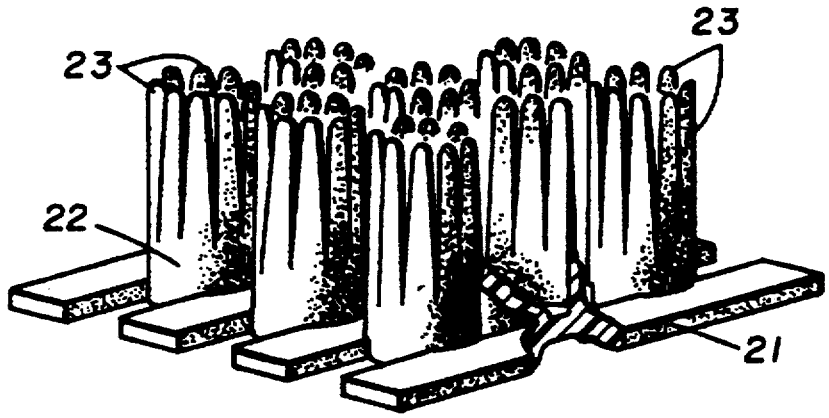

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-5 is confirmed.

* * * * *